United States Patent [19]

Yamada et al.

[11] Patent Number: 5,595,718
[45] Date of Patent: Jan. 21, 1997

[54] PROCESS FOR PRODUCING A CRYSTALLINE SILICON NITRIDE POWDER

[75] Inventors: Tetsuo Yamada; Takeshi Yamao; Yasukazu Kondo; Hideo Nakamura; Tadayuki Mitani, all of Ube, Japan

[73] Assignee: UBE Industries Ltd., Yamaguchi, Japan

[21] Appl. No.: 496,852

[22] Filed: Jun. 20, 1995

[51] Int. Cl.⁶ .................................................. C01B 21/068
[52] U.S. Cl. .......................................... 423/344; 423/324
[58] Field of Search ........................... 422/344; 423/324, 423/344

[56] References Cited

U.S. PATENT DOCUMENTS 4,716,028  12/1987  Kasai et al. ............................ 423/344

FOREIGN PATENT DOCUMENTS 58-55316    4/1983   Japan.
1-313308   12/1989   Japan.
6-321510   11/1994   Japan.
6-329404   11/1994   Japan.
7-89703     4/1995   Japan.

*Primary Examiner*—Michael Lewis
*Assistant Examiner*—Amy M. Harding
*Attorney, Agent, or Firm*—Burgess, Ryan and Wayne

[57] ABSTRACT

A crystalline silicon nitride powder having a high specific surface area and an enhanced sintering property is produced with a high producibility and a large scale, by calcining a silane material comprising at least one nitrogen-containing silane compound in a nitrogen-containing inert gas mixed with 0.1 to 5%, based on the total volume of the mixed gas, of molecular oxygen, preferably at 600° to 1200° C.; baking the resultant amorphous silicon nitride powder in a nitrogen-containing inert gas preferably at 1400° to 1700° C.; and milling the resultant crystalline silicon nitride powder in a mixed gas atmosphere comprising 5 to 40% by volume of molecular oxygen and the balance consisting of an inert gas preferably at 0° to 100° C.

11 Claims, No Drawings

PROCESS FOR PRODUCING A CRYSTALLINE SILICON NITRIDE POWDER

BACKGROUND OF THE INVENTION

1. Field of the Invention

The present invention relates to a process for producing a crystalline silicon nitride powder which is useful as a starting material for producing a sintered silicon nitride material suitable for high temperature structural applications.

2. Description of Related Art

A conventional method of producing a crystalline silicon nitride powder by baking an amorphous silicon nitride powder produced by thermal decomposition of a nitrogen-containing silane compound, for example, silicon diimide, in an inert gas atmosphere is known.

In this conventional method, to enhance the sintering property of the resultant crystalline silicon nitride powder, it is necessary that the specific surface area and oxygen content of the powder are respectively in an appropriate range.

Also, there is a close relationship between the specific surface area and the oxygen content of the crystalline silicon nitride powder. Namely, it is known that the oxygen content increases with increase in the specific surface area, and the specific surface area increases with increase in the oxygen content. This is because oxide layers or oxynitride layers form on the surfaces of the crystalline silicon nitride particles.

Accordingly, to control the specific surface area of the crystalline silicon nitride powder to a desired level, it is most important to Control the content and distribution of oxygen in the crystalline silicon nitride particles.

However, where the amorphous silicon nitride powder, which is a starting material for the crystalline silicon nitride powder, is produced by thermal decomposition of the imide compound, since it is necessary to remove as much oxygen as possible from the reaction system, it is difficult to greatly vary the oxygen content of the amorphous silicon nitride powder.

This is because the imide compound, which has a high reactivity, easily reacts with oxygen to produce silicon dioxide, and the resultant silicon dioxide remains, as an impurity, in the amorphous silicon nitride powder.

SUMMARY OF THE INVENTION

An object of the present invention is to provide a process for producing a crystalline silicon nitride powder, capable of controlling a specific surface area, oxygen content and ratio therebetween of the resultant crystalline silicon nitride particles to desired levels.

The above-mentioned object can be attained by the process of the present invention for producing a crystalline silicon nitride powder, which comprises the steps of:

calcining a silane material comprising, as a principal component, at least one nitrogen-containing silane compound in a mixed gas atmosphere comprising a nitrogen-containing inert gas and 0.1 to 5%, based on the total volume of the mixed gas, of molecular oxygen, to provide an amorphous silicon nitride powder;

baking the amorphous silicon nitride powder in a nitrogen-containing inert gas atmosphere, to provide a crystalline silicon nitride powder; and milling the crystalline silicon nitride powder in a mixed gas atmosphere comprising 5 to 40% by volume of molecular oxygen gas and the balance consisting of an inert gas.

DESCRIPTION OF THE PREFERRED EMBODIMENTS

In the first step of the process of the present invention, a silane material comprising, as a principal component, at least one nitrogen-containing silane compound is calcined in a mixed gas atmosphere which comprises a nitrogen-containing inert gas and 0.1 to 5%, based on the total volume of the mixed gas, of molecular oxygen, to provide an amorphous silicon nitride powder.

The nitrogen-containing silane compounds usable for the present invention include silicon diimide, silicon tetraamide, silicon nitrogen imide and silicon chloroimide. These nitrogen-containing silane compounds can be produced by, for example, a process in which a silicon halide, for example, silicon tetrafluoride, silicon tetrachloride, silicon tetrabromide, or silicon tetraiodide, is reacted with ammonia in the gas phase, or another process in which the silicon halide is reacted with a liquid ammonia.

The silane material comprising at least one nitrogen-containing silane compound is calcined preferably at a temperature of from 600° C. to 1200° C., more preferably 800° C. to 1100° C., in a mixed gas atmosphere comprising 0.1 to 5%, based on the total volume of the mixed gas, of molecular oxygen and the balance consisting of a nitrogen-containing inert gas. The nitrogen-containing inert gas preferably comprises nitrogen alone or a mixture of nitrogen with at least one member selected from the group consisting of argon, helium, hydrogen and ammonia.

In the mixed gas atmosphere for the calcining step, the molecular oxygen is contained in a content of 0.1 to 5%, preferably 1 to 2%, based on the total volume of the mixed gas. If the content of the molecular oxygen is less than 0.1% by volume, the specific surface area-enhancing effect on the resultant crystalline silicon nitride particles is unsatisfactory. Also, if the molecular oxygen content is more than 5% by volume, the nitrogen-containing silane compound, for example, a silane imide easily reacts with oxygen to produce a large amount of silicon dioxide, and the resultant silicon dioxide undesirably remains as an impurity in the resultant crystalline silicon nitride powder.

The content of the molecular oxygen in the mixed gas atmosphere is established in response to the processing rate of the nitrogen-containing silane compound and the flow rate of the mixed gas. Also, the flow rate of the mixed gas is necessarily adjusted in response to the processing rate of the nitrogen-containing silane compound. Preferably, the molecular oxygen is picked up in an amount of 0.1 to 0.4%, based on the weight of the amorphous silicon nitride, by the amorphous silicon nitride powder from the mixed gas atmosphere. The picked-up oxygen is present in the form of oxides and/or oxynitrides on or in the amorphous silicon nitride particles.

The resultant amorphous silicon nitride particles preferably have a total oxygen content of 0.6 to 0.9% by weight.

In the process of the present invention, the molecular oxygen mixed in a controlled amount of 0.1 to 5% by volume into the nitrogen-containing inert gas enables the specific surface area of the resultant crystalline silicon nitride particles to be increased, and thus is contributory not only to an increase in the ratio of the specific surface area to the oxygen content of the crystalline silicon nitride particles and thus enhancing the sintering performance of the crystalline silicon nitride particles but also to enhancing the mechanical strength and toughness of the sintered silicon nitride article.

The reasons for the increase in the specific surface area of the crystalline silicon nitride particles are not fully apparent. However, the reasons are assumed to be as follows.

In the diffused reflection method FT-IR measurement, it has been found that where the calcination of the nitrogen-containing silane compound is carried out in the presence of molecular oxygen, a certain amount of oxygen is picked up by the resultant amorphous silicon nitride particles and Si—H groups are formed in the surface portions of the particles. Where the amorphous silicon nitride particles are further baked at a high temperature, the hydrogen atoms are released from the Si—H groups, and the hydrogen atom-poor portions of the particle surface provide crystallizing-nucleus starting points of the crystalline silicon nitride. Therefore, it is assumed that due to the above-mentioned phenomena, the obtained crystalline silicon nitride particles consist of fine crystals and have an increased specific surface area.

In the second step of the process of the present invention, the amorphous silicon nitride powder is baked in a nitrogen-containing inert gas atmosphere, to convert the amorphous silicon nitride powder to a crystalline silicon nitride powder.

Preferably, the baking is carried out at a temperature of 1400° C. to 1700° C., more preferably 1450° to 1600° C. If the baking temperature is lower than 1400° C., the crystallization of silicon nitride particles cannot be fully attained. Also, if the baking temperature is higher than 1700° C., the silicon nitride particles are easily crystallized to form undesirable coarse crystals.

The heating furnace for calcining the silane material comprising the nitrogen-containing silane compound and for baking the amorphous silicon nitride powder are usually selected from conventional furnace, for example, batch type ovens, continuous-processing furnaces with push conveyer, rotary kiln furnaces, shaft kiln furnaces and fluidization baking furnaces each having a high frequency induction heating system or a resistance heating system. Especially, continuous baking furnaces are means for effectively dissipating heat derived from the crystallization reaction of the amorphous silicon nitride.

In the third step of the process of the present invention, the crystalline silicon nitride powder is milled in a mixed gas atmosphere comprising 5 to 40% by volume of molecular oxygen and the balance consisting of an inert gas, preferably at a temperature of 0° C. to 100° C. The mixed gas for the milling procedure comprises 5 to 40% by volume, preferably 10 to 30% by volume and the balance consisting of an inert gas preferably comprising at least one member selected from nitrogen helium and argon. Preferably, air is employed as the mixed gas. There is no specific limitation to the milling method. The milling procedure can be carried out by using a conventional milling apparatus, for example, a vibration mill, or an attritor. The milling procedure effectively breaks the fuse-adhesion and aggregation of the crystalline silicon nitride particles, with each other, which occurred during the baking procedure. As a result of the milling procedure, the concentration of a oxygen fraction distributed in the surface portions of the silicon nitride particles and the specific surface area of the particles increase and thus the sintering performance, including heat resistance, oxidation resistance, mechanical strength, toughness, hardness and the anti-creeping property, of the resultant crystalline silicon nitride particles is enhanced.

The milled crystalline silicon nitride particles preferably have a total oxygen content of 1.0 to 1.4% by weight.

EXAMPLES

The present invention will be further explained in detail by the following examples in comparison with a comparative example.

Example 1

A silicon diimide powder was charged in a feed hopper of a rotary kiln having a diameter of 150 mm and a length of 2800 mm (a heating length: 1000 mm). The inside of the rotary kiln was deaerated into a reduced pressure of 0.1 torr or less; a mixed gas, consisting of oxygen in a content of 2% by volume and the balance consisting of nitrogen, was introduced into the rotary kiln at a total flow rate of 250 Nl/hr; and then heating of the rotary kiln was started.

When the inside highest temperature of the rotary kiln reached 1000° C., a screw feeder of the hopper was rotated to feed the silicon diimide powder into the rotary kiln at a powder feed rate of 3 kg/hr. The rotary kiln was operated at an inclination angle of 2 degrees, at a rotation rate of 1 rpm and maintained at the highest temperature for 10 minutes.

Then, the resultant amorphous silicon nitride powder (having an oxygen content of 0.75% by weight) was placed in a carbon-made crucible having an inner diameter of 280 mm, and a height of 150 mm, and the crucible was set in a batch type electric furnace.

The inside of the electric furnace was deaerated into a reduced pressure of 0.1 torr or less and, while a nitrogen gas flowed through the inside of the furnace, the crucible was heated at a heating rate of 50° to 100° C./hr to a level of 1550° C. and held of this level for one hour.

The resultant crystalline silicon nitride particles had an oxygen content of 0.8% by weight including an oxygen fraction located in the surface portions of the particles of 0.15% by weight. The particles had a specific surface area of 10 $m^2/g$.

The crystalline silicon nitride particles were placed in a vibration mill and milled at room temperature in the ambient air atmosphere for 30 minutes. The milled crystalline silicon nitride particles had an oxygen content of 1.25% by weight, including an oxygen fraction located in the surface portions of the particles of 0.60% by weight, and a specific surface area of 11 $m^2/g$.

A mixture of 93% by weight of the resultant milled crystalline silicon nitride powder with 5% by weight of yttria (made by Shinetsu Kagaku K.K.) and 2% by weight of alumina (made by Sumitomo Kagaku K.K., trademark: AKP-30) was wet-mixed and milled together with a mixing medium consisting of ethyl alcohol at room temperature for 48 hours in a ball mill and then dried under reduced pressure.

The resultant mixture was preliminarily molded into a rectangular parallelopiped by using a mold having an inside width of 50 mm, an inside length of 80 mm and an inside thickness of 6.5 mm. The rectangular parallelopiped was rubber-pressed under a pressure of 1500 $kg/cm^2$.

The resultant rectangular parallelopiped was sintered by using an electric furnace at a temperature of 1780° C. in a nitrogen gas atmosphere for 2 hours.

The resultant sintered article had the bulk density, bending strength and toughness shown in Table 1.

The bulk density was measured by the Archimedean method.

The bending strength was measured by the following method in accordance with Japanese Industrial Standard (JIS) R 1601.

The sintered article was cut to provide specimens having a length of 40 mm, a width of 4 mm and a thickness of 3 mm. Each specimen was fixed in a four-point bending tester having an outside span of 30 mm and an inside span of 10 mm, and the bending strengths of the specimen were measured at room temperature and at a temperature of 1200° C.

The bending strength at room temperature was indicated by an average of the measurement results of 40 specimens. The bending strength at 1200° C. was indicated by an average of the measurement results of 10 specimens.

The toughness was measured, in accordance with Japanese Industrial Standard (JIS) R 1607, using the BEPB method.

The test results are shown in Table 1.

Comparative Example 1

A silicon diimide powder was charged in the feed hopper of the same rotary kiln as in Example 1. The inside of the rotary kiln was deaerated into a reduced pressure of 0.1 torr or less; a nitrogen gas was introduced into the rotary kiln at a total flow rate of 250 Nl/hr; and then heating of the rotary kiln was started. The concentration of oxygen in the gas in the furnace was 0.005% by volume.

When the inside highest temperature of the rotary kiln reached 1000° C., a screw feeder of the hopper was rotated to feed the silicon diimide powder into the rotary kiln at a powder feed rate of 3 kg/hr. The rotary kiln was operated at an inclination angle of 2 degrees, at a rotation rate of 1 rpm and maintained at the highest temperature for 10 minutes.

Then, the resultant amorphous silicon nitride powder (having an oxygen content of 0.55% by weight) was placed in a carbon crucible having an inner diameter of 280 mm, and a height of 150 mm, and the crucible was set in a batch type electric furnace.

The inside of the electric furnace was deaerated into a reduced pressure of 0.1 torr or less, and while a nitrogen gas flowed through the inside of the furnace, the crucible was heated at a heating rate of 50° to 100° C./hr to a level of 1550° C., and held at this level for one hour.

The resultant crystalline silicon nitride particles had an oxygen content of 0.75% by weight including an oxygen fraction, located an the surface portions of the particles, of 0.10% by weight. The particles had a specific surface area of 8 m²/g.

The crystalline silicon nitride particles were placed in a vibration mill and milled at room temperature in the ambient air atmosphere for 30 minutes. The milled crystalline silicon nitride particles had an oxygen content of 1.20% by weight including a content of an oxygen fraction located in the surface portions of the particles of 0.55% by weight and a specific surface area of 9.5 m²/g.

A mixture of 93% by weight of the resultant milled crystalline silicon nitride powder with 5% by weight of yttria (made by Shinetsu Kagaku K.K.) and 2% by weight of alumina (made by Sumitomo Kagaku K.K., trademark: AKP-30) was wet-mixed and milled together with a mixing medium consisting of ethyl alcohol at room temperature for 48 hours in a ball mill and then dried under reduced pressure.

The resultant mixture was preliminarily molded into a rectangular parallelopiped by using a mold having an inside width of 50 mm, an inside length of 80 mm and an inside thickness of 6.5 mm. The rectangular parallelopiped was rubber-pressed under a pressure of 1500 kg/cm².

The resultant rectangular parallelopiped was sintered, using an electric furnace, at a temperature of 1780° C. in a nitrogen gas atmosphere for 2 hours.

The resultant sintered article had the bulk density, bending strength and toughness shown in Table 1.

Example 2

The same procedures and tests as in Example 1 were carried out with the following exceptions.

The mixed gas atmosphere in the rotary kiln for the thermal decomposition of the silicon diimide consisted of 1% by volume of oxygen and the balance consisting of nitrogen.

The resultant crystalline silicon nitride particles had an oxygen content of 0.75% by weight, including the oxygen content on the surface portions of the particles, of 0.15% by weight, and a specific surface area of 9.5 m²/g.

The crystalline silicon nitride particles were charged into a vibration mill, and milled in the ambient air atmosphere at room temperature for 30 minutes.

The resultant milled crystalline silicon nitride particles had an oxygen content of 1.20% by weight, including the oxygen content in the surface portions of the particles of 0.60% by weight, and a specific surface area of 10.5 m²/g.

The resultant milled crystalline silicon nitride particles were employed to produce the same sintered article as in Example 1.

The bulk density, bending strength and toughness of the sintered article are as shown in Table 1.

TABLE 1

| | Unsintered silicon nitride particles | | Sintered silicon nitride article | | | |
| --- | --- | --- | --- | --- | --- | --- |
| | | | | Bending Strength (kg/mm²) | | Fracture toughness |
| Example No. | Oxygen content (% by wt) | Supecific surface area (m²/g) | Bulk density (%) | Room temperature | 1200° C. | value $K_*$ (MPa m$^{1/2}$) |
| Example 1 | 1.25 | 11.0 | >98.5 | 110 | 70 | 7.0 |
| Example 2 | 1.20 | 10.5 | 98.3 | 107 | 68 | 6.8 |

TABLE 1-continued

| | Item | | | | | |
|---|---|---|---|---|---|---|
| | Unsintered silicon nitride particles | | Sintered silicon nitride article | | | |
| | | | | Bending Strength (kg/mm$^2$) | | Fracture toughness |
| Example No. | Oxygen content (% by wt) | Supecific surface area (m$^2$/g) | Bulk density (%) | Room temperature | 1200° C. | value K$_k$ (MPa m$^{1/2}$) |
| Comparative Example 1 | 1.20 | 9.5 | 93.0 | 70 | 30 | <5.5 |

In accordance with the process of the present invention, the specific surface area, the oxygen content, and the ratio therebetween, of the crystalline silicon nitride particles can be controlled to desired levels and thus crystalline silicon nitride particles having an excellent sintering property can be used to produce sintered silicon nitride articles having excellent heat resistance, oxidation resistance, mechanical strength, toughness, and hardness and a satisfactory anti-creep property.

We claim:

1. A process for producing a crystalline silicon nitride powder, comprising the steps of:

calcining a silane material comprising, as a principal component, at least one nitrogen-containing silane compound in a mixed gas atmosphere comprising a nitrogen-containing inert gas and 0.1 to 5%, based on the total volume of the mixed gas, of molecular oxygen, to provide an amorphous silicon nitride powder the calcining being performed to pick up an amount of oxygen of 0.1 to 0.4% by weight;

baking the amorphous silicon nitride powder in a nitrogen-containing inert gas atmosphere, to provide a crystalline silicon nitride powder; and milling the crystalline silicon nitride powder in a mixed gas atmosphere comprising 5 to 40% by volume of molecular oxygen gas and the balance consisting of an inert gas.

2. The process as claimed in claim 1, wherein the nitrogen-containing silane compound is selected from the group consisting of silicon diimide, silicon tetraamide, silicon nitrogen imide, and silicon chloroimide.

3. The process as claimed in claim 1, wherein the calcin ing procedure is carried out at a temperature of 600° C. to 1200° C.

4. The process as claimed in claim 1, wherein the nitrogen-containing inert gas for the calcining procedure is selected from the group consisting of nitrogen and mixtures of nitrogen with at least one member selected from the group consisting of argon, helium, hydrogen and ammonia.

5. The process as claimed in claim 1, wherein during the calcining procedure, oxygen is introduced in an amount of 0.1 to 0.4% based on the total weight of the resultant amorphous silicon nitride powder, from the mixed gas atmosphere into the resultant amorphous silicon nitride powder.

6. The process as claimed in claim 1, wherein the baking procedure is carried out at a temperature of from 1400° C. to 1700° C.

7. The process as claimed in claim 1, wherein the nitrogen-containing inert gas for the baking procedure comprises a member selected from the group consisting of nitrogen and mixtures of nitrogen with at least one member selected from the group consisting of argon and helium.

8. The process as claimed in claim 1, wherein the milling procedure is carried out at a temperature of from 0° C. to 100° C.

9. The process as claimed in claim 1, wherein the milling procedure is carried out in an ambient air atmosphere.

10. The process as claimed in claim 1, wherein the amorphous silicon nitride powder prepared by the calcining step has a total oxygen content of 0.6 to 0.9% by weight.

11. The process as claimed in claim 1, wherein the milled crystalline silicon nitride powder has a total oxygen content of 1.0 to 1.4% by weight.

* * * * *